US008906250B2

(12) United States Patent
Kaneko et al.

(10) Patent No.: US 8,906,250 B2
(45) Date of Patent: Dec. 9, 2014

(54) LUBRICANT COMPOSITION FOR REFRIGERATING MACHINE AND COMPRESSOR USING THE SAME

(75) Inventors: Masato Kaneko, Ichihara (JP); Harutomo Ikeda, Ichihara (JP); Tokue Sato, Ichihara (JP); Takayuki Kato, Kariya (JP); Takahiro Hoshida, Kariya (JP); Masato Takamatsu, Kariya (JP); Masahiro Suzuki, Kariya (JP); Shuichi Yasuda, Kariya (JP); Masataka Muto, Kariya (JP); Shozo Ikejima, Kariya (JP); Masahito Yamashita, Kariya (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 104 days.

(21) Appl. No.: 12/744,285

(22) PCT Filed: Nov. 20, 2008

(86) PCT No.: PCT/JP2008/071110
§ 371 (c)(1),
(2), (4) Date: May 21, 2010

(87) PCT Pub. No.: WO2009/066727
PCT Pub. Date: May 28, 2009

(65) Prior Publication Data
US 2010/0281912 A1 Nov. 11, 2010

(30) Foreign Application Priority Data
Nov. 22, 2007 (JP) ................. 2007-302932

(51) Int. Cl.
*C09K 5/04* (2006.01)
*C10M 107/24* (2006.01)
*C10M 107/34* (2006.01)
*C10M 145/26* (2006.01)

(52) U.S. Cl.
CPC .............. *C09K 5/045* (2013.01); *C10M 107/24* (2013.01); *C10M 107/34* (2013.01); *C10M 145/26* (2013.01); *C01M 171/008* (2013.01); *C09K 2205/112* (2013.01); *C09K 2205/126* (2013.01); *C10M 2207/026* (2013.01); *C10M 2207/0406* (2013.01); *C10M 2207/042* (2013.01); *C10M 2209/043* (2013.01); *C10M 2209/104* (2013.01); *C10M 2209/1055* (2013.01); *C10M 2209/1075* (2013.01); *C10M 2209/108* (2013.01); *C10M 2209/1085* (2013.01); *C10M 2223/041* (2013.01); *C10N 2220/022* (2013.01); *C10N 2220/302* (2013.01); *C10N 2230/66* (2013.01); *C10N 2240/30* (2013.01); *C10N 2280/00* (2013.01)
USPC ............................................ 252/68; 508/579

(58) Field of Classification Search
USPC .......................................... 252/68; 508/579
See application file for complete search history.

(56) References Cited

U.S. PATENT DOCUMENTS

| | | | | |
|---|---|---|---|---|
| 5,449,472 A * | 9/1995 | Egawa et al. | ................... | 252/68 |
| 5,454,963 A | 10/1995 | Kaneko | | |
| 5,648,016 A | 7/1997 | Klug et al. | | |
| 6,258,293 B1 * | 7/2001 | Iizuka et al. | ................... | 252/68 |
| 6,260,380 B1 * | 7/2001 | Arman et al. | ................... | 62/646 |
| 6,752,065 B2 * | 6/2004 | Sugioka et al. | ................ | 92/12.2 |
| 6,815,402 B2 * | 11/2004 | Tazaki et al. | .................. | 508/422 |
| 6,921,205 B2 * | 7/2005 | Kanayama et al. | ............. | 384/13 |
| 6,994,474 B2 * | 2/2006 | Kinno et al. | .................. | 384/492 |
| 7,018,961 B2 | 3/2006 | Tazaki | | |
| 2004/0224856 A1 * | 11/2004 | Saiki et al. | ..................... | 508/108 |
| 2005/0233923 A1 | 10/2005 | Singh et al. | | |
| 2005/0256014 A1 | 11/2005 | Sherman et al. | | |
| 2007/0007488 A1 | 1/2007 | Singh et al. | | |
| 2008/0098755 A1 | 5/2008 | Singh et al. | | |
| 2008/0099190 A1 | 5/2008 | Singh et al. | | |
| 2010/0132397 A1 | 6/2010 | Kaneko et al. | | |

FOREIGN PATENT DOCUMENTS

| | | | |
|---|---|---|---|
| EP | 0 463 773 A2 | 1/1992 | |
| EP | 0 463 773 A3 | 1/1992 | |
| JP | 3 52995 | 3/1991 | |
| JP | 3 275799 | 12/1991 | |
| JP | 04-081495 | * | 3/1992 |
| JP | 4 81495 | 3/1992 | |
| JP | 4 110388 | 4/1992 | |
| JP | 5 17792 | 1/1993 | |
| JP | 5 279658 | 10/1993 | |
| JP | 6 1970 | 1/1994 | |
| JP | 7-102275 A | 4/1995 | |
| JP | 7 507342 | 8/1995 | |
| JP | 08-209180 | 8/1996 | |
| JP | 10 8078 | 1/1998 | |
| JP | 290 1369 | 6/1999 | |
| JP | 2000 96075 | 4/2000 | |
| JP | 2000 154390 | 6/2000 | |

(Continued)

OTHER PUBLICATIONS

U.S. Appl. No. 12/919,412, filed Aug. 25, 2010, Sato, et al.

(Continued)

*Primary Examiner* — John Hardee
(74) *Attorney, Agent, or Firm* — Oblon, Spivak, McClelland, Maier & Neustadt, L.L.P.

(57) ABSTRACT

A lubricating oil composition for refrigerator including a base oil and an acid scavenger, and a compressor using the composition are provided, where the acid scavenger is a polyalkylene glycol derivative represented by a formula (1) as follows:

$$R^1\text{—}[(OR^2)_e\text{—}OR^3]_f \qquad (1)$$

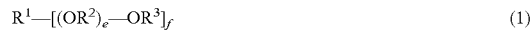

and the base oil is at least one compound selected from a group consisting of polyvinyl ether, polyalkylene glycol and an ether-base compound represented by a formula (2) as follows, $$Ra\text{-}[(ORb)n\text{-}(X)\text{—}(ORc)k]x\text{-}Rd \qquad (2)$$

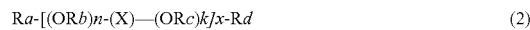

where meanings of respective signs are as described in the specification.

19 Claims, No Drawings

(56) References Cited

FOREIGN PATENT DOCUMENTS

| | | |
|---|---|---|
| JP | 2002 356694 | 12/2002 |
| JP | 2006 503961 | 2/2006 |
| JP | 2006 512426 | 4/2006 |
| JP | 2006-316147 A | 11/2006 |
| JP | 2007 137953 | 6/2007 |
| JP | 2007 532767 | 11/2007 |
| JP | 2008 208261 | 9/2008 |
| WO | 92 17563 | 10/1992 |
| WO | 00 60021 | 10/2000 |
| WO | 2004 037752 | 5/2004 |
| WO | 2004 037913 | 5/2004 |
| WO | 2005 103190 | 11/2005 |
| WO | 2005 103191 | 11/2005 |
| WO | 2006 094303 | 9/2006 |
| WO | 2007 002625 | 1/2007 |
| WO | 2007 029746 | 3/2007 |
| WO | 2007 105452 | 9/2007 |

OTHER PUBLICATIONS

Extended European Search Report issued on Sep. 16, 2011 in the corresponding European Application No. 08852622.3.

Japanese Office Action Issued Apr. 23, 2013 in Patent Application No. 2009-542584 (with English translation).

* cited by examiner

LUBRICANT COMPOSITION FOR REFRIGERATING MACHINE AND COMPRESSOR USING THE SAME

CROSS-REFERENCE TO RELATED APPLICATIONS

This application is a National Stage of PCT/JP08/071110 filed Nov. 20, 2008 and claims the benefit of JP 2007-302932 filed Nov. 22, 2007.

TECHNICAL FIELD

The present invention relates to a lubricating oil composition for refrigerator used in compression freezers of various freezer fields and a compressor using the same.

BACKGROUND ART

In general, a compression freezer includes a compressor, a condenser, an expansion valve and an evaporator. Within an enclosed system of the compression freezer, a liquid mixture of a refrigerant and lubricating oil is circulated. In such a compression freezer, dichlorodifluoromethane (R12) and chlorodifluoromethane (R22) and the like are often used as refrigerant. In addition, various mineral oil and synthetic oil are used as lubricating oil However, chlorofluorocarbon such as R12 and R22 as mentioned above may bring about an environmental pollution such as destruction of the stratospheric ozone layer, a use of which has come to be more strictly regulated on a global scale in recent years. Thus, a hydrogen-containing chlorofluorocarbon compound such as hydrofluorocarbon or hydrochlorofluorocarbon is attracting more and more attentions as a new refrigerant. Such a hydrogen-containing chlorofluorocarbon compound, especially hydrofluorocarbon represented by R134a, is a preferable refrigerant for compression freezers not only because the compound does not destroy the ozone layer but also because the compound can be used in conventional freezers in place of R12 and the like without requiring configurations of the conventional freezers to be changed (e.g., see Patent Document 1).

On the other hand, since hydrofluorocarbon may also bring about an impact on the environment in terms of global warming, a so-called natural refrigerant such as carbon dioxide or ammonia is also receiving more and more attractions as an alternative refrigerant that is more suitable for environmental protection. Refrigerator oil using such a natural refrigerant has been also proposed (e.g., see Patent Document 2). In addition, a refrigerant having a specific polar structure in its molecule such as an unsaturated fluorohydrocarbon compound, a fluoroether compound, a fluoroalcohol compound or a fluoroketone compound has been found to have lower global warming potential (e.g., see Patent Document 3 and Patent Document 4).

Patent Document 1: JP-A-10-008078
Patent Document 2: JP-2000-96075
Patent Document 3: JP-T-2006-503961
Patent Document 4: JP-T-07-507342

DISCLOSURE OF THE INVENTION

Problems to be Solved by the Invention

However, the refrigerator oil disclosed in Patent Document 1 or 2 is not necessarily sufficiently superior in terms of energy saving. For instance, even when the refrigerator oil is used in a freezer such as a car air-conditioner or an electric refrigerator, friction between an aluminum product and a steel product of the freezer remains large, which is problematic in terms of energy saving. In addition, since a great variety of refrigerants are available as described above, it has been difficult to provide refrigerant oil that is widely applicable to freezers each of which employs a different refrigerant. Especially, excellent stability as well as excellent compatibility with the refrigerant is required for the lubricating oil for the refrigerator using the refrigerant disclosed in Patent Documents 3 and 4. However, no lubricating oil that exhibits sufficient stability has been provided yet. When unstable refrigerant such as unsaturated fluorohydrocarbon compound is used, sludge generated in the refrigerator may be clogged or a gasket inside the freezer may be peeled off on account of generated acid.

An object of the invention is to provide a lubricating oil composition for refrigerator with excellent stability that does not generate a sludge or cause gasket peeling even when a refrigerant unstable to acid such as unsaturated fluorohydrocarbon compound is used, and a compressor using the composition.

Means for Solving the Problems

In order to solve the above-mentioned problems, according to an aspect of the present invention, lubricating oil compositions for refrigerator as follows are provided:

[1] a lubricating oil composition for refrigerator, including: a base oil; and an acid scavenger added to the base oil, in which the acid scavenger is a polyalkylene glycol derivative represented by the following formula (1),

where $R^1$ represents a hydrocarbon group having 1 to 10 carbon atoms or glycidyl group, $R^2$ is alkylene group having 2 to 4 carbon atoms and $R^3$ is glycidyl group, e is an integer of 5 to 40 and f is an integer of 1 to 10, R1 being glycidyl group when f=1,)

the base oil is at least one compound selected from a group consisting of polyvinyl ether, polyalkylene glycol and an ether-base compound represented by a formula (2) as follows,

where: Ra and Rd each represent a hydrogen atom, an alkyl group having 1 to 10 carbon atoms, an acyl group having 2 to 10 carbon atoms or a hydrocarbon group having 2 to 6 bonding sites and 1 to 10 carbon atoms; Rb and Rc each represent an alkylene group having 2 to 4 carbon atoms; n and k each represent an integer in a range of 0 to 20; x represents an integer in a range of 1 to 6; and (X) represents a polymerization site containing 3 or more monomer units each represented by the following formula (3).

[Chemical Formula 1]

where: $R^4$, $R^5$ and $R^6$ each represent a hydrogen atom or a hydrocarbon group having 1 to 8 carbon atoms, $R^4$, $R^5$ and $R^6$ being allowed to be mutually the same or different; $R^7$ represents a divalent hydrocarbon group having 1 to 10 carbon atoms or divalent ether-bonded oxygen-containing hydrocarbon group having 2 to 20 carbon atoms; $R^8$ represents a hydrogen atom, a hydrocarbon group having 1 to 20 carbon atoms; m represents a number whose average value is in a range of 0 to 10; when m is plural, plural m are allowed to be mutually the same or different per each unit; $R^4$ to $R^8$ each are allowed to be mutually the same or different per each unit; when $R^7O$ is plural, plural $R^7O$ may be mutually the same or different; and when k and n in the formula (2) both represent 0, m in the formula (3) represents an integer of 1 or more;

[2] the above-described lubricating oil composition for refrigerator, in which the acid scavenger is contained in a range of 0.1 to 30 mass % per a total amount of the composition;

[3] the above-described lubricating oil composition for refrigerator, in which kinematic viscosity of the base oil at 100 degrees C. is in a range of 2 to 50 mm$^2$/s;

[4] the above-described lubricating oil composition for refrigerator, in which the lubricating oil composition for refrigerator is used for a refrigerant containing: at least one of fluorine-containing organic compounds selected from the compounds represented by the following molecular formula (A); or a combination of the fluorine-containing organic compound and saturated fluorohydrocarbon compound,

$$C_pO_qF_rR_s \qquad (A)$$

where R represents Cl, Br, I or hydrogen, p is an integer in a range of 1 to 6, q is an integer in a range of 0 to 2, r is an integer in a range of 1 to 14 and s is an integer in a range of 0 to 13, in a condition that p is an integer in a range of 2 to 6 when q is 0 and at least one unsaturated carbon-carbon bonding is present in the molecule;

[5] the above-described lubricating oil composition for refrigerator, the compound represented by the molecular formula (A) is a compound represented by at least one of molecular formulae of $C_3HF_5$, $C_3H_2F_4$ and $C_3H_3F_3$;

[6] the above-described lubricating oil composition for refrigerator, in which the base oil is further added with at least one additive selected from a group consisting of an extreme pressure agent, an oiliness agent, an antioxidant, a metal deactivator and an antifoaming agent;

[7] the above-described lubricating oil composition for refrigerator, a slide portion of a refrigerator is made of engineering plastic, or is provided with an organic coating layer or an inorganic coating layer;

[8] the above-described lubricating oil composition for refrigerator, in which the organic coating layer is a coating layer of polytetrafluoroethylene, a coating layer of polyimide, a coating layer of polyamideimide or a thermosetting insulation layer formed with use of a resin paint containing: a resin base material made of polyhydroxyether resin and polysulfone-base resin; and a cross-linking agent;

[9] the above-described lubricating oil composition for refrigerator, in which the inorganic coating layer is a graphite layer, a diamond-like carbon layer, a tin layer, a chrome layer, a nickel layer or a molybdenum layer;

[10] the above-described lubricating oil composition for refrigerator, in which the lubricating oil composition for refrigerator is used in an open-type car air conditioner, an electric driven car air conditioner, a gas heat pump, an air conditioning device, a refrigerator, a vending machine, a showcase, various hot-water supply systems or a cooling/heating system;

[11] the above-described lubricating oil composition for refrigerator, in which a water content within the system is 500 ppm by mass or less while a residual air partial pressure is 13 kPa or less;

[12] a compressor using the above-described lubricating oil composition for refrigerator;

[13] the above-described compressor, in which a slide portion of a refrigerator is made of engineering plastic, or is provided with an organic coating layer or an inorganic coating layer;

[14] the above-described compressor, in which the engineering plastic is a polyamide resin, a polyphenylene sulfide resin or a polyacetal resin;

[15] the above-described compressor, in which the organic coating layer is a coating layer of polytetrafluoroethylene, a coating layer of polyimide, a coating layer of polyamideimide or a thermosetting insulation layer formed with use of a resin paint containing: a resin base material made of polyhydroxyether resin and polysulfone-base resin; and a cross-linking agent; and

[16] the above-described compressor, in which the inorganic coating layer is a graphite layer, a diamond-like carbon layer, a tin layer, a chrome layer, a nickel layer or a molybdenum layer.

Since the lubricating oil composition for refrigerator of the above aspect of the invention contains at least one base oil selected from the group consisting of polyvinyl ether, polyalkylene glycol and the specific ether-base compound and glycidyl of a predetermined structure as the acid scavenger, a minute amount of acid residing in the freezer system can be scavenged, thereby preventing reaction between acid and refrigerant. Therefore, since the lubricating oil composition for refrigerator of the invention does not generate a sludge in a freezer and also does not cause peeling on the gasket of the freezer, the composition can be stably used for a long time.

Accordingly, the lubricating oil composition for refrigerator of the invention and the compressor using the composition can be suitable for a long time in a device using unsaturated chlorofluorocarbon refrigerant that is especially reactive with acid such as car air conditioner, electric driven car air conditioner, gas heat pump, air conditioning device, refrigerator, vending machine, showcase, various hot-water supply system and cooling/heating system freezer.

BEST MODE FOR CARRYING OUT THE INVENTION

A preferred embodiment for implementing the present invention will be described below.

A lubricating oil composition for refrigerator of the invention contains a predetermined glycidyl ether as oxygen scavenger in a predetermined base oil.

The base oil is at least one composition selected from the group consisting of polyvinyl ether, polyalkylene glycol and ether composition represented by the above formula (2).

First of all, the base oil will be described below.

(1) Polyvinyl Ether (PVE)

Examples of the polyvinyl ether used as the base oil are a copolymer prepared by polymerizing vinyl ether monomer (hereinafter called as polyvinyl ether I), a compound prepared by copolymerizing vinyl ether monomer and hydrocarbon monomer having olefin double-bond(s) (hereinafter called as polyvinyl ether copolymer II), and a copolymer of polyvinyl ether and alkylene glycol, polyalkylene glycol or monoether thereof (hereinafter called as polyvinyl ether copolymer III).

Examples of vinyl ether monomer used as the material of the polyvinyl ether I are vinyl methyl ether, vinyl ethyl ether, vinyl-n-propyl ether, vinyl isopropyl ether, vinyl-n-butyl ether, vinyl-isobutyl ether, vinyl-sec-butyl ether, vinyl-tert-butyl ether, vinyl-n-pentyl ether, vinyl-n-hexyl ether, vinyl-2-methoxyethyl ether, vinyl-2-ethoxyethyl ether, vinyl-2-methoxy-1-methylethyl ether, vinyl-2-methoxy-propyl ether, vinyl-3,6-dioxaheptyl ether, vinyl-3,6,9-trioxadecyl ether, vinyl-1,4-dimethyl-3,6-dioxaheptyl ether, vinyl-1,4,7-trimethyl-3,6,9-trioxadecyl ether, vinyl-2,6-dioxa-4-heptyl ether, vinyl-2,6,9-trioxa-4-decyl ether, 1-methoxypropene, 1-ethoxypropene, 1-n-propoxypropene, 1-isopropoxypropene, 1-n-butoxypropene, 1-isobutoxypropene, 1-sec-butoxypropene, 1-tert-butoxypropene, 2-methoxypropene, 2-ethoxypropene, 2-n-propoxypropene, 2-isopropoxypropene, 2-n-butoxypropene, 2-isobutoxypropene, 2-sec-butoxypropene, 2-tert-butoxypropene, 1-methoxy-1-butene, 1-ethoxy-1-butene, 1-n-propoxy-1-butene, 1-isopropoxy-1-butene, 1-n-butoxy-1-butene, 1-isobutoxy-1-butene, 1-sec-butoxy-1-butene, 1-tert-butoxy-1-butene, 2-methoxy-1-butene, 2-ethoxy-1-butene, 2-n-propoxy-1-butene, 2-isopropoxy-1-butene, 2-n-butoxy-1-butene, 2-isobutoxy-1-butene, 2-sec-butoxy-1-butene, 2-tert-butoxy-1-butene, 2-methoxy-2-butene, 2-ethoxy-2-butene, 2-n-propoxy-2-butene, 2-isopropoxy-2-butene, 2-n-butoxy-2-butene, 2-isobutoxy-2-butene, 2-sec-butoxy-2-butene, 2-tert-butoxy-2-butene and the like. The above vinyl ether-base monomers can be manufactured by a known method.

One of the above vinyl ether monomers may be singularly used or a combination of two or more thereof may be used.

The vinyl ether monomers listed above each may be also used as the material for the polyvinyl ether copolymer II. One of the above vinyl ether monomers may be singularly used or a combination of two or more thereof may be used.

Examples of the hydrocarbon monomer having olefin double-bond(s), which is the other material of the polyvinyl ether copolymer II, are ethylene, propylene, butenes, pentenes, hexenes, heptenes, octenes, diisobutylene, triisobutylene, styrene, α-methylstyrene, alkyl-substituted styrenes and the like.

One of the above hydrocarbon monomers having olefin double-bond(s) may be singularly used or a combination of two or more thereof may be used. The polyvinyl ether copolymer II may be a block copolymer or a random copolymer.

The polyvinyl ether I and the polyvinyl ether copolymer II can be manufactured exemplarily by the following method.

At the initial stage of the polymerization, a compound prepared by combining Bronsted acids, Lewis acids or organometallic compounds with water, alcohols, phenols, acetals or an adduct of vinyl ethers and a carboxylic acid may be used. Examples of the Bronsted acids are hydrofluoric acid, hydrochloric acid, hydrobromic acid, hydroiodic acid, nitric acid, sulfuric acid, trichloroacetic acid, trifluoroacetic acid and the like. Examples of the Lewis acids are boron trifluoride, aluminum trichloride, aluminum tribromide, tin tetrachloride, zinc dichloride, ferric chloride and the like, among which boron trifluoride is particularly preferable. Examples of the organometallic compounds are diethylaluminum chloride, ethylaluminum chloride, diethylzinc and the like.

An initiating terminal of the polymer, from which the polymerization of the polymer is initiated, is a hydrogen atom when water, alcohols or phenols is used. On the other hand, when acetals is used, the initiating terminal is a hydrogen atom or a residue formed by eliminating one of alkoxy groups from the used acetals. In addition, when the adduct of vinyl ethers and carboxylic acid is used, the initiating terminal is a residue formed by eliminating an alkylcarbonyloxy group originated in the carboxylic acid from the adduct of vinyl ethers and carboxylic acid.

On the other terminal, at which the polymerization of the polymer is ended, is acetal, olefin or aldehyde when water, alcohols, phenols or acetals is used. When the adduct of vinyl ether and carboxylic acid is used, the end terminal is carboxylic ester of hemiacetal. The terminals of the polymer as described above may be substituted by desirable group(s) by a known method. Examples of the desirable group(s) are a saturated hydrocarbon residue, an ether residue, an alcohol residue, a ketone residue, a nitril residue and an amid residue, among which a saturated hydrocarbon residue, an ether residue and an alcohol residue are preferable.

Although depending on materials and initiators to be used, reaction of the polymerization can be initiated within a temperature range of −80 to 150 degrees C., typically within a temperature range of −80 to 50 degrees C. The reaction of the polymerization is ended in ten seconds to ten hours after the initiation of the reaction. The reaction of the polymerization is usually conducted under the presence of solvent. The solvent is not particularly limited as long as a sufficient amount of the reaction material can be dissolved in the solvent and the solvent is inactive against the reaction. Hydrocarbon-base solvent such as hexane, benzene or toluene and ether-base solvent such as ethyl ether, 1,2-dimethoxyethane or tetrahydrofuran can be preferably used.

On the other hand, the polyvinyl ether copolymer III can be manufactured by using alkylene glycol, polyalkylene glycol or monoether thereof as the initiator and polymerizing the vinyl ether monomer in accordance with the above polymerizing method.

Examples of the alkylene glycol, the polyalkylene glycol or the monoether thereof are alkylene glycol or polyalkylene glycol such as ethylene glycol, diethylene glycol, triethylene glycol, polyethylene glycol, propylene glycol, dipropylene glycol, tripropylene glycol or polypropylene glycol, and alkylene glycol monoether or polyalkylene glycol monoether such as ethylene glycol monomethylether, diethylene glycol monomethylether, triethylene glycol monomethylether, propylene glycol monomethylether, dipropylene glycol monomethylether, or tripropylene glycol monomethylether.

The vinyl ether monomers listed in the description of the polyvinyl ether I may be used as the materials for the polyvinyl ether copolymer III. One of the above vinyl ether monomers may be singularly used or a combination of two or more thereof may be used.

In the present invention, one of the above polyvinyl ether may be singularly used or a combination of two or more thereof may be used.

When the polyvinyl ether is used as the base oil of the lubricating oil composition for refrigerator according to the present invention, its kinetic viscosity at 40 degrees C. is preferably 1 to 400 mm²/s, more preferably 5 to 250 mm²/s.

[2] Polyalkylene Glycol (PAG)

An example of the polyalkylene glycol used in the base oil of the lubricating oil composition for refrigerator according to the present invention is a compound represented by the following formula (4).

(4)

In the formula, $R^9$ represents a hydrogen atom, an alkyl group having 1 to 10 carbon atoms, an acyl group having 2 to 10 carbon atoms or an aliphatic hydrocarbon group having 2 to 6 bonding sites and 1 to 10 carbon atoms, $R^{10}$ represents an alkylene group having 2 to 4 carbon atoms, $R^{11}$ represents a hydrogen atom, an alkyl group having 1 to 10 carbon atoms or an acyl group having 2 to 10 carbon atoms, n1 represents an integer in a range of 1 to 6, and m1 represents a number that is determined such that the average value of m1 multiplied by n1 is in a range of 6 to 80.)

In the formula (4), the alkyl groups represented by $R^9$ and $R^{11}$ each may be linear, branched or cyclic. Examples of the alkyl groups are a methyl group, an ethyl group, an n-propyl group, an isopropyl group, butyl groups, pentyl groups, hexyl groups, heptyl groups, octyl groups, nonyl groups, decyl groups, a cyclopentyl group, a cyclohexyl group and the like. When the number of the carbon atoms contained in the alkyl group(s) exceeds 10, compatibility of the base oil with the refrigerant is deteriorated, so that a crude separation may occur. The alkyl group(s) preferably has 1 to 6 carbon atoms.

In addition, alkyl groups of the acyl groups represented by $R^9$ and $R^{11}$ each may be linear, branched or cyclic. Examples of the alkyl groups of the acyl groups are the same groups as listed in the above description of the alkyl groups. The examples of the alkyl groups of the acyl groups each has 1 to 9 carbon atoms. When the number of the carbon atoms contained in the acyl group(s) exceeds 10, compatibility of the base oil with the refrigerant is deteriorated, so that a crude separation may occur. The acyl group(s) preferably has 2 to 6 carbon atoms.

When $R^9$ and $R^{11}$ each represent an alkyl group or an acyl group, $R^9$ and $R^{11}$ may be mutually the same or different.

In addition, when n1 is 2 or more, plural $R^9$ included in one molecule may be the same or mutually different.

When $R^9$ is an aliphatic hydrocarbon group having 2 to 6 bonding sites and 1 to 10 carbon atoms, the aliphatic hydrocarbon group may be linear or cyclic. Examples of the aliphatic hydrocarbon group having 2 bonding sites are an ethylene group, a propylene group, a butylene group, a pentylene group, a hexylene group, a heptylene group, an octylene group, a nonylene group, a decylene group, a cyclopentylene group, a cyclohexylene group and the like. An example of an aliphatic hydrocarbon group having 3 to 6 bonding sites is a residue formed by eliminating a hydroxyl group from multivalent alcohol such as trimethylol propane, glycerin, pentaerythritol, sorbitol, 1,2,3-trihydroxycyclohexane, or 1,3,5-trihydroxycyclohexane.

When the number of the carbon atoms contained in the aliphatic hydrocarbon group exceeds 10, compatibility of the base oil with the refrigerant is deteriorated, so that a crude separation may occur. The aliphatic hydrocarbon group preferably has 2 to 6 carbon atoms.

In the formula (4), $R^{10}$ represents an alkylene group having 2 to 4 carbon atoms. Examples of an oxyalkylene group, which is a repeating unit of the alkylene group, are an oxyethylene group, an oxypropylene group, an oxybutylene group and the like. Although a plurality of oxyalkylene groups included in one molecule may be mutually the same or different, at least one oxypropylene group is preferably included in one molecule. More preferably, an oxypropylene unit is contained in an oxyalkylene unit with a content of 50 mol % or more.

In the formula (4), n1, which represents an integer in a range of 1 to 6, is determined in accordance with the number of the bonding sites of $R^9$. For instance, n1 is 1 when $R^9$ is an alkyl group or an acyl group while n1 is 2, 3, 4, 5 or 6 when $R^9$ is an aliphatic hydrocarbon group having 2, 3, 4, 5 or 6 bonding sites respectively. In addition, m1 is determined so that the average value of m1 multiplied by n1 is in a range of 6 to 80. When the average value of m1 multiplied by n1 is not in the above range, an object of the present invention will not be sufficiently achieved.

The polyalkylene glycol represented by the formula (4) contains polyalkylene glycol having hydroxyl groups at its terminals. As long as the content of the hydroxyl groups is 50 mol % or less of the total terminal groups, the polyalkylene glycol containing the hydroxyl groups can be preferably used. When the content of the hydroxyl groups is more than 50 mol %, hygroscopicity is unfavorably increased, such that viscosity index is decreased.

Polyalkylene glycols such as polypropylene glycol dimethylether, polyoxyethylene, polypropylene glycol dimethylether, polypropylene glycol monobutylether or polypropylene glycol diacetate are preferable in view of cost and effects. Incidentally, in a copolymer of polyoxypropylene (PO) unit and polyoxyethylene (EO) unit such as polyoxypropylene-polyoxyethylene copolymer dimethyl ether, the mol ratio of PO/EO is in a range of 99:1 to 10:90. The copolymer may be either one of a random polymer or a block polymer.

The polyalkylene glycol-base compound represented by the formula (4) may be any one of the compounds described in detail in JP-A-02-305893.

In the present invention, one of the polyalkylene glycol may be singularly used or a combination of two or more thereof may be used.

When the polyalkylene glycol is used as the base oil of the lubricating oil composition for refrigerator according to the present invention, its kinetic viscosity at 40 degrees C. is preferably 1 to 400 mm²/s, more preferably 5 to 250 mm²/s.

[3] Ether-Base Compound

In the lubricating oil composition for refrigerator according to the present invention, an ether-based compound having a structure represented by the following formula (2) is preferably used in the base oil.

$$Ra\text{-}[(ORb)n\text{-}(B)\text{---}(ORc)k]x\text{-}Rd \quad (2)$$

where: Ra and Rd each represent a hydrogen atom, an alkyl group having 1 to 10 carbon atoms, an acyl group having 2 to 10 carbon atoms or a hydrocarbon group having 2 to 6 bonding sites and 1 to 10 carbon atoms; Rb and Rc each represent an alkylene group having 2 to 4 carbon atoms; n and k each represent an integer in a range of 0 to 20; x represents an integer in a range of 1 to 6; and (B) represents a polymerization site containing 3 or more monomer units each represented by the following formula (3).

[Chemical Formula 2]

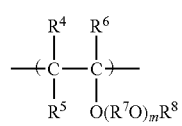

(3)

In the formula (3), $R^4$, $R^5$ and $R^6$ each represent a hydrogen atom or a hydrocarbon group having 1 to 8 carbon atoms. $R^4$, $R^5$ and $R^6$ may be mutually the same or different.

The hydrocarbon group specifically means an alkyl group such as a methyl group, an ethyl group, an n-propyl group, an isopropyl group, an n-butyl group, an isobutyl group, a sec-butyl group, a tert-butyl group, pentyl groups, hexyl groups or heptyl groups, a cycloalkyl group of a cyclopentyl group, a cyclohexyl group, methylcyclohexyl groups, ethylcyclohexyl groups, dimethylcyclohexyl groups or the like, an aryl group of a phenyl group, methylphenyl groups, ethylphenyl groups or dimethylphenyl groups, or an arylalkyl group of a benzyl group, phenylethyl groups or methylbenzyl groups. $R^4$, $R^5$ and $R^6$ each preferably represent a hydrogen atoms in view of stability of synthesizing reaction.

On the other hand, $R^7$ represents a divalent hydrocarbon group having 1 to 10 carbon atoms or an ether-bonded oxygen-containing divalent hydrocarbon group having 2 to 20 carbon atoms. Examples of the divalent hydrocarbon group having 1 to 10 carbon atoms are: a divalent aliphatic group such as a methylene group, an ethylene group, a phenylethylene group, a 1,2-propylene group, a 2-phenyl-1,2-propylene group, a 1,3-propylene group, butylene groups, pentylene groups, hexylene groups, heptylene groups, octylene groups, nonylene groups or decylene groups; an alicyclic group having two bonding sites at an alicyclic hydrocarbon such as cyclohexane, methylcyclohexane, ethylcyclohexane, dimethylcyclohexane or propylcyclohexan; a divalent aromatic hydrocarbon group such as phenylene groups, methylphenylene groups, ethylphenylene groups, dimethylphenylene groups or naphthylene groups; an alkyl aromatic group having a monovalent bonding site respectively in an alkyl group portion and an aromatic group portion of alkyl aromatic hydrocarbon such as toluene, xylene, or ethylbenzene; and an alkyl aromatic group having a bonding site in an alkyl group portion of polyalkyl aromatic hydrocarbon such as xylene or diethylbenzene. Among the above, the aliphatic group having 2 to 4 carbon atoms is particularly preferable in view of the compatibility of the base oil with the refrigerant.

Preferable examples of the ether-bonded oxygen-containing divalent hydrocarbon group having 2 to 20 carbon atoms are a methoxymethylene group, a methoxyethylene group, a methoxymethylethylene group, a 1,1-bis-methoxymethylethylene group, a 1,2-bis-methoxymethylethylene group, an ethoxymethylethylene group, a (2-methoxyethoxy)methylethylene group, a (1-methyl-2-methoxy)methylethylene group and the like. In the formula (3), m represents the number of units $R^7O$, an average value of which is 0 to 10, preferably 0 to 5. When plural m are present, the plural m may be mutually the same or different per unit. When plural units of $R^7O$ are contained, the plural units of $R^7O$ may be mutually the same or different. When both k and n are 0, m is an integer of 1 or more in the formula (3).

$R^8$ represents a hydrogen atom or a hydrocarbon group having 1 to 20 carbon atoms. The hydrocarbon group specifically means an alkyl group of a methyl group, an ethyl group, an n-propyl group, an isopropyl group, an n-butyl group, an isobutyl group, a sec-butyl group, a tert-butyl group, pentyl groups, hexyl groups, heptyl groups, octyl groups, nonyl groups, decyl groups or the like, a cycloalkyl group of a cyclopentyl group, a cyclohexyl group, methylcyclohexyl groups, ethylcyclohexyl groups, propylcyclohexyl groups, dimethylcyclohexyl groups or the like, an aryl group of a phenyl group, methylphenyl groups, ethylphenyl groups, dimethylphenyl groups, propylphenyl groups, trimethylphenyl groups, butylphenyl groups, naphthyl groups or the like, or an arylalkyl group of a benzyl group, phenylethyl groups, methylbenzyl groups, phenylpropyl groups, phenylbutyl groups or the like. Plural $R^4$ to $R^8$ of the plural units may be mutually the same or different per unit.

By copolymerizing the ether-base compound having the monomer unit represented by the formula (3), lubricity, insulation properties, hygroscopicity and the like can be enhanced while a sufficient level of the compatibility with the refrigerant is retained. At this time, by suitably selecting a type of the monomer used as the material, a type of the initiator and a copolymer ratio, the level of the above performance of the lubricating oil composition for refrigerator can be set at a target level. Accordingly, it is possible to obtain an oil composition that can exhibit required levels of lubricity and compatibility that vary depending on: types of compressors used in freezing or air-conditioning systems to which lubricating oil is applied; materials and freezing capabilities of lubricating portions; and types of refrigerants.

In the ether-base compound represented by the formula (2), (B) represents a polymerization site containing three or more monomer units each represented by the formula (3). The number of the monomer units (i.e., polymerization degree) can be suitably determined in accordance with a desired level of kinetic viscosity. The polymerization degree is typically determined so that the kinetic viscosity at 100 degrees C. becomes preferably 2 to 50 mm²/s, more preferably 5 to 50 mm²/s, further more preferably 5 to 30 mm², particularly preferably 5 to 20 mm²/s. Preferably in the ether-base compound represented by the formula (2), its mole ratio of carbon to oxygen (mole ratio of carbon/oxygen) is 4 or less. When the mole ratio is more than 4, the compatibility of the compound with a natural refrigerant such as carbon dioxide is deteriorated.

Instead of representing a homopolymer site containing the monomer units each represented by the formula (3), (B) in the formula (2) may represent a block copolymer site or a random copolymer site containing the monomer unit(s) represented by the formula (3) and monomer unit(s) represented by the following formula (5).

[Chemical Formula 3]

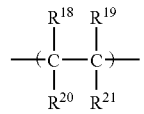

(5)

In the formula (5), $R^{18}$ to $R^{21}$ each represent a hydrogen atom or a hydrocarbon group having 1 to 20 carbon atoms. $R^{18}$ to $R^{21}$ may be mutually the same or different. Examples of the hydrocarbon group having 1 to 20 carbon atoms are the same as those of $R^8$ in the formula (3). In addition, $R^{18}$ to $R^{21}$ of plural monomer units may be mutually the same or different per monomer unit.

Polymerization degree of the ether-base compound represented by the formula (2), which contains a block or random copolymer containing the monomer unit(s) represented by the formula (3) and the monomer unit(s) represented by the formula (5), may be suitably determined in accordance with a desired level of kinetic viscosity. The polymerization degree is typically determined such that the kinetic viscosity at 100 degrees C. preferably becomes 5 mm²/s or more, more preferably 5 to 20 mm²/s. Preferably in the ether-base compound, its mole ratio of carbon/oxygen is 4 or less. When the mole ratio is more than 4, the compatibility of the compound with a natural refrigerant such as carbon dioxide is deteriorated.

The above ether-base compound can be manufactured by polymerizing the relevant vinyl ether-base monomer or by copolymerizing the relevant hydrocarbon monomer having olefin double-bond(s) and the relevant vinyl ether-base monomer.

In view of stability of synthesizing reaction, the ether-base compound is preferably structured such that, in the formula (2), Ra represents a hydrogen atom and n equals to 0 at the first terminal of the compound while Rd represents a hydrogen atom and k equals to 0 at the second terminal of the compound.

Such an ether-base compound can be manufactured by performing such polymerization on a monomer as radical polymerization, cation polymerization or radiation polymerization. For instance, by polymerizing a vinyl ether-base monomer in accordance with the following method, the obtained polymer of the vinyl ether-base monomer can exhibit a desired level of viscosity. At the initial stage of the polymerization, a compound prepared by combining Bronsted acids, Lewis acids or organometallic compounds with water, alcohols, phenols, acetals or an adduct of vinyl ethers and a carboxylic acid may be used. Examples of the Bronsted acids are hydrofluoric acid, hydrochloric acid, hydrobromic acid, hydroiodic acid, nitric acid, sulfuric acid, trichloroacetic acid, trifluoroacetic acid and the like. Examples of the Lewis acids are boron trifluoride, aluminum trichloride, aluminum tribromide, tin tetrachloride, zinc dichloride, ferric chloride and the like, among which boron trifluoride is particularly preferable. Examples of the organometallic compounds are diethylaluminum chloride, ethylaluminum chloride, diethylzinc and the like.

Water, alcohols, phenols, acetals or an adduct of vinyl ethers and a carboxylic acid that is to be combined with the above may be suitably determined. Examples of the alcohols are saturated aliphatic alcohol having 1 to 20 carbon atoms such as methanol, ethanol, propanol, isopropanol, butanol, isobutanol, sec-butanol, tert-butanol, pentanols, hexanols, heptanols or octanols, unsaturated aliphatic alcohol having 3 to 10 carbon atoms such as aryl alcohol, monoether of alkylene glycol such as ethylene glycol monomethyl ether, diethylene glycol monomethyl ether, triethylene glycol monomethyl ether, propylene glycol monomethyl ether, dipropylene glycol monomethyl ether or tripropylene glycol monomethyl ether, and the like. Examples of the carboxylic acid used for preparing the adduct of vinyl ethers and the carboxylic acid are acetic acid, propionic acid, n-butyric acid, iso-butyric acid, n-valeric acid, iso-valeric acid, 2-methyl butyric acid, pivalic acid, n-caproic acid, 2,2-dimethyl butyric acid, 2-methyl valeric acid, 3-methyl valeric acid, 4-methyl valeric acid, enanthic acid, 2-methyl caproic acid, caprylic acid, 2-ethyl caproic acid, 2-n-propyl valeric acid, n-nonane acid, 3,5,5-trimethyl caproic acid, caprylic acid, undecane acid and the like.

In the present invention, the above described base oil may be used singly or in mixture. In either case, the polymerization degree is typically determined so that the kinetic viscosity at 100 degrees C. becomes preferably 2 to 50 mm$^2$/s, more preferably 5 to 50 mm$^2$/s, further more preferably 5 to 30 mm$^2$, particularly preferably 5 to 20 mm$^2$/s.

A molecular weight of the base oil is preferably in a range of 500 to 5,000 in view of evaporation prevention, the flash point, performance as the refrigerator oil and the like, more preferably in a range of 600 to 3,000. The viscosity index is preferably 60 or more.

In the lubricating oil composition for refrigerator of the present invention, polyalkylene glycol derivative represented by the following formula (1) is blended to the base oil as oxygen scavenger.

In the above, $R^1$ represents a hydrocarbon group having 1 to 10 carbon atoms or a glycidyl group. The hydrocarbon group preferably has 10 or less carbon atoms in view of compatibility with the base oil or refrigerant. When the hydrocarbon group has 11 or more of carbon atoms, the above-described compatibility is deteriorated. $R^2$ represents alkylene group having 2 to 4 carbon atoms, which preferably is ethylene group or isopropylene group. $R^3$ represents a glycidyl group.

e is an integer in a range of 5 to 40, preferably 6 to 35 and more preferably 7 to 30. When e is 4 or less, sufficient acid scavenger effect cannot be obtained and gasket is likely to be peeled after using a freezer for a long time. On the other hand, when e is 41 or more, sludge is likely to be generated in the freezer. f represents an integer in a range of 1 to 10. $R^1$ is a glycidyl group when f=1.

Specifically, the acid scavenger blended in the lubricating oil composition for refrigerator of the invention is a polyalkylene glycol derivative having one or more glycidyl group(s).

The examples are: polypropylene glycol monoglycidyl ether, polypropylene glycol diglycidyl ether, polyethylene glycol diglycidyl ether and glyceryl tri(polypropylene glycol glycidyl ether)ether and the like. Average mass molecular weight (Mw) of the compounds is preferably in a range of 300 to 5000, more preferably 400 to 3000.

The polyalkylene glycol derivative is contained in the entire composition in a range of 0.1 to 30 mass % in order to exhibit sufficient performance as acid scavenger, more preferably in a range of 0.5 to 20 mass % and most preferably 1 to 10 mass %. When the content of the polyalkylene glycol derivative exceeds 30 mass %, the polyalkylene glycol derivative is unfavorably polymerized to increase viscosity thereof when the freezer is driven for a long time.

The refrigerant to which the lubricating oil composition for refrigerator of the invention is to be applied may alternatively be saturated fluorohydrocarbon (HFC), carbon dioxide ($CO_2$), low-boiling hydrocarbon (HC) or ammonia. However, the refrigerant preferably contains at least one fluorine-containing organic compound selected from the compound represented by the following molecular formula (A) or a combination of the fluorine-containing organic compound and a saturated fluorohydrocarbon compound in terms of low global warming potential thereof

where R represents Cl, Br, I or hydrogen, p is an integer in a range of 1 to 6, q is an integer in a range of 0 to 2, r is an integer in a range of 1 to 14 and s is an integer in a range of 0 to 13, in a condition that p is an integer in a range of 2 to 6 when q is 0 and at least one unsaturated carbon-carbon bonding is present in the molecule.

The refrigerant represented by the above molecular formula (A) will be described below in detail.

The molecular formula (A) represents type and number of the element in the molecular. The formula (A) represents a fluorine-containing organic compound, in which the number of carbon atom (p) is in a range of 1 to 6. Fluorine-containing organic compound having 1 to 6 carbon atoms can provide physical and chemical properties required as refrigerant such as boiling point, setting point and evaporative latent heat.

In the molecular formula (A), the p carbon atoms represented by $C_p$ may be bonded in carbon-carbon single bond, unsaturated bond such as carbon-carbon double bond and carbon-oxygen double bond. The carbon-carbon unsaturated bond is preferably carbon-carbon double bond in terms of stability. One or more of the unsaturated bond may be provided, however, only one saturated bond is preferable.

In the molecular formula (A), the q bonded oxygen atoms represented by $O_q$ is preferably oxygen of ether group, hydroxyl group or carbonyl group. The number q of the oxygen atom may be 2, where two ether groups or hydroxyl groups may be contained.

When q of $O_q$ is 0 and no oxygen is contained in the molecule, p is in a range of 2 to 6, where at least one unsaturated bond such as carbon-carbon double bond is contained in the molecule. In other words, it is necessary for at least one of the bonds of p carbon atoms represented by $C_p$ to be a carbon-carbon unsaturated bond.

In the molecular formula (A), R may be any one of Cl, Br, I and H. However, R is preferably H in view of ozone friendliness thereof.

As described above, suitable examples of the fluorine-containing organic compound represented by the formula (A) are unsaturated fluorohydrocarbon compound, fluoroether compound, fluoroalcohol compound and fluoroketone compound.

The above compounds will be described below in detail.
(Unsaturated Fluorohydrocarbon Compound)

In the invention, the unsaturated fluorohydrocarbon compound used as the refrigerant of freezer is exemplarily an unsaturated fluorohydrocarbon compound represented by the molecular formula (A), where R is H, p is in a range of 2 to 6, q is 0, r is in a range of 1 to 12 and s is in a range of 0 to 11.

Preferable example of such an unsaturated fluorohydrocarbon compound is a fluoride of linear or branched chain olefin having 2 to 6 carbon atoms and a fluoride of cyclic olefin having 4 to 6 carbon atoms.

Specific examples are ethylene in which 1 to 3 fluorine atom(s) is introduced, propene in which 1 to 5 fluorine atom(s) is introduced, butenes in which 1 to 7 fluorine atom(s) is introduced, pentenes in which 1 to 9 fluorine atom(s) is introduced, hexanes in which 1 to 11 fluorine atom(s) is introduced, cyclobutene in which 1 to 5 fluorine atom(s) is introduced, cyclopentene in which 1 to 7 fluorine atom(s) is introduced and cyclohexene in which 1 to 9 fluorine atom(s) is introduced.

Among the unsaturated fluorohydrocarbon compounds, unsaturated fluorohydrocarbon compound having 2 to 3 carbon atoms is preferable. Fluoride of propene is especially preferable. Specifically, the compound represented by the molecular formula (A) is preferably a compound represented by at least one of molecular formulae of $C_3HF_5$, $C_3H_2F_4$ and $C_3H_3F_3$ in terms of lower global warming potential. Examples of the fluoride of propene are various isomers of pentafluoropropene, 3,3,3-trifluoropropene and 2,3,3,3-tetrafluoropropene. Among these, 1,2,3,3,3-pentafluoropropene (HFC1225ye) and 2,3,3,3-tetrafluoropropene (HFC1234yf) are preferable in terms of lower global warming potential.

In the invention, one of the unsaturated fluorohydrocarbon compounds may be singularly used or a combination of two or more thereof may be used.

Alternatively, a combination of saturated fluorohydrocarbon refrigerant having 1 to 2 carbon atoms and unsaturated fluorohydrocarbon refrigerant having 3 carbon atoms is also favorably used. Such a combination include a combination of the above HFC1225ye and $CH_2F_2$(HFC32), a combination of HFC1225ye and $CHF_2CH_3$(HFC152a) and a combination of the above HFC1234yf and $CF_3I$.

(Fluoroether Compound)

In the invention, the fluoroether compound used as the refrigerant of freezer is exemplarily a fluoroether compound represented by the molecular formula (A), where R is H, p is in a range of 2 to 6, q is in a range of 1 to 2, r is in a range of 1 to 14 and s is in a range of 0 to 13.

Favorable examples of such a fluoroether compound include: a fluoride of chain aliphatic ether having 2 to 6 carbon atoms, 1 to 2 ether bond and linear or branched alkyl group; and a fluoride of cyclic aliphatic ether having 3 to 6 carbon atoms and 1 to 2 ether bond.

Specific examples are di-methyl ether in which 1 to 6 fluorine atom(s) is introduced, methyl ethyl ether in which 1 to 8 fluorine atom(s) is introduced, di-methoxy methane in which 1 to 8 fluorine atom(s) is introduced, methyl propyl ethers in which 1 to 10 fluorine atom(s) is introduced, methyl butyl ethers in which 1 to 12 fluorine atom(s) is introduced, ethyl propyl ethers in which 1 to 12 fluorine atom(s) is introduced, oxetane in which 1 to 6 fluorine atom(s) is introduced, 1,3-dioxolan in which 1 to 6 fluorine atom(s) is introduced and tetrahydrofuran in which 1 to 8 fluorine atom(s) is introduced.

Examples of such a fluoroether compound are hexafluoro dimethyl ether, pentafluoro dimethyl ether, bis(difluoromethyl)ether, fluoromethyl trifluoromethyl ether, perfluorodimethoxymethane, 1-trifluoromethoxy-1,1,2,2-tetrafluoroethane, difluoromethoxypentafluoroethane, 1-trifluoromethoxy-1,2,2,2-tetrafluoroethane, 1-difluoromethoxy-1,1,2,2-tetrafluoroethane, 1-difluoromethoxy-1,2,2,2-tetrafluoroethane, 1-trifluoromethoxy-2,2,2-trifluoroethane, 1-difluoromethoxy-2,2,2-trifluoroethane, perfluorooxetane, perfluoro-1,3-dioxolan, various isomers of pentafluorooxetane and various isomers of tetrafluorooxetane.

In the present invention, one of the fluoroether compounds may be singularly used or a combination of two or more thereof may be used.

(Fluoroalcohol Compound)

In the invention, the fluoroalcohol compound used as the refrigerant of freezer is exemplarily a fluoroalcohol compound represented by the molecular formula (A), where R is H, p is in a range of 1 to 6, q is in a range of 1 to 2, r is in a range of 1 to 13 and s is in a range of 1 to 13.

A favorable example of such a fluoroalcohol compound is a fluoride of linear or branched aliphatic alcohol having 1 to 6 carbon atoms and 1 to 2 hydroxyl group.

Specific examples are methyl alcohol in which 1 to 3 fluorine atom(s) is introduced, ethyl alcohol in which 1 to 5 fluorine atom(s) is introduced, propyl alcohol in which 1 to 7 fluorine atom(s) is introduced, butyl alcohol in which 1 to 9 fluorine atom(s) is introduced, pentyl alcohol in which 1 to 11 fluorine atom(s) is introduced, ethylene glycol in which 1 to 4 fluorine atom(s) is introduced and propylene glycol in which 1 to 6 fluorine atom(s) is introduced.

Examples of such a fluoroalcohol compound are monofluoromethyl alcohol, difluoromethyl alcohol, trifluoromethyl alcohol, various isomers of difluoroethyl alcohol, various isomers of trifluoroethyl alcohol, various isomers of tetrafluoroethyl alcohol, pentafluoroethyl alcohol, various isomers of difluoropropyl alcohol, various isomers of trifluoropropyl alcohol, various isomers of tetrafluoropropyl alcohol, various isomers of pentafluoropropyl alcohol, various isomers of hexafluoropropyl alcohol, heptafluoropropyl alcohol, various isomers of difluorobutyl alcohol, various isomers of trifluorobutyl alcohol, various isomers of tetrafluorobutyl alcohol, various isomers of pentafluorobutyl alcohol, various isomers of hexafluorobutyl alcohol, various isomers of heptafluorobutyl alcohol, various isomers of octafluorobutyl alcohol, nonafluorobutyl alcohol, various isomers of difluoroethylene glycol, trifluoroethylene glycol, tetrafluoroethylene glycol, various isomers of difluoropropylene glycol, various isomers of trifluoropropylene glycol, various isomers of tetrafluoropropylene glycol, various isomers of pentafluoropropylene glycol, fluoropropylene glycol such as hexafluoropropylene glycol and fluorotrimethylene glycol corresponding to the fluoropropylene glycol.

In the present invention, one of the fluoroalcohol compounds may be singularly used or a combination of two or more thereof may be used.

(Fluoroketone Compound)

In the invention, the fluoroketone compound used as the refrigerant of freezer is exemplarily a fluoroketone compound represented by the molecular formula (A), where R is H, p is in a range of 2 to 6, q is in a range of 1 to 2, r is in a range of 1 to 12 and s is in a range of 0 to 11.

A favorable example of such a fluoroketone compound is a fluoride of aliphatic ketone having 3 to 6 carbon atoms and linear or branched alkyl group.

Specifically, acetone in which 1 to 6 fluorine atom(s) is introduced, methyl ethyl ketone in which 1 to 8 fluorine atom(s) is introduced, diethyl ketone in which 1 to 10 fluorine atom(s) is introduced and methyl propyl ketones in which 1 to 10 fluorine atom(s) is introduced.

Examples of such a fluoroketone compound are hexafluorodimethylketone, pentafluorodimethylketone, bis(difluoromethyl)ketone, fluoromethyltrifluoromethylketone, trifluoromethylmethylketone, perfluoromethylethylketone, trifluoromethyl-1,1,2,2-tetrafluoroethylketone, difluoromethylpentafluoroethylketone, trifluoromethyl-1,1,2,2-tetrafluoroethylketone, difluoromethyl-1,1,2,2-tetrafluoroethylketone, difluoromethyl-1,2,2,2-tetrafluoroethylketone, trifluoromethyl-2,2,2-trifluoroethylketone, difluoromethyl-2,2,2-trifluoroethylketone.

In the present invention, one of the fluoroketone compounds may be singularly used or a combination of two or more thereof may be used.

(Saturated Fluorohydrocarbon Compound)

The saturated fluorohydrocarbon compound is a refrigerant that may be blended with at least one fluorine-containing organic compound selected from the compounds represented by the formula (A).

Preferable example of the saturated fluorohydrocarbon compound is a fluoride of alkane having 1 to 4 carbon atoms, which especially preferably is fluoride of methane and ethane having 1 to 2 carbon atoms such as trifluoromethane, difluoromethane, 1,1-difluoroethane, 1,1,1-trifluoroethane, 1,1,2-trifluoroethane, 1,1,1,2-tetrafluoroethane, 1,1,2,2-tetrafluoroethane and 1,1,1,2,2-pentafluoroethane. The saturated fluorohydrocarbon compound may alternatively be a compound formed by further halogenating the above fluoride of alkane with halogen atom other than fluorine, which exemplarily is a trifluoro iodomethane ($CF_3I$). In the invention, one of the saturated fluorohydrocarbon compounds may be singularly used or a combination of two or more thereof may be used.

The content of such saturated fluorohydrocarbon compound is typically 30 mass % or less relative to the total amount of the refrigerant, preferably 20 mass % or less and more preferably 10 mass % or less.

The lubricating oil composition for refrigerator according to the present invention may be added with at least one additive selected from a group consisting of an extreme pressure agent, an oiliness agent, an antioxidant, a metal deactivator and an antifoaming agent as long as an object of the present invention can be achieved.

Examples of the extreme pressure agent are phosphorus-base extreme pressure agents such as phosphate ester, acid phosphate ester, phosphite ester, acid phosphite ester and amine salts thereof.

Among the above phosphorus-base extreme pressure agents, tricresyl phosphate, trithiophenyl phosphate, tris(nonylphenyl)phosphate, dioleyl hydrogen phosphate, 2-ethylhexyl diphenyl phosphate and the like are particularly preferable in view of extreme pressure properties, friction characteristics and the like.

Another example of the extreme pressure agent is a metal salt of carboxylic acid. The metal salt of carboxylic acid is preferably a metal salt of carboxylic acid having 3 to 60 carbon atoms, more preferably a metal salt of carboxylic acid having 3 to 30 carbon atoms, particularly preferably a metal salt of aliphatic acid having 12 to 30 carbon atoms. The metal salt of carboxylic acid may be a metal salt of dimer acid or trimer acid of the aliphatic acid, or a metal salt of dicarboxylic acid having 3 to 30 carbon atoms. Among the above, a metal salt of aliphatic acid having 12 to 30 carbon atoms and a metal salt of dicarboxylic acid having 3 to 30 carbon atoms are particularly preferable.

On the other hand, a metal of the metal salt is preferably an alkali metal or an alkali earth metal. Particularly, an alkali metal is suitable.

Further examples of the extreme pressure agent other than the above-listed examples are sulfur-base extreme pressure agents such as sulfurized fat and oil, sulfurized aliphatic acid, ester sulfide, olefin sulfide, dihydrocarbyl polysulfide, thiocarbamates, thioterpenes, dialkylthiodipropionates and the like.

The extreme pressure agent is typically contained in the composition with a content of 0.001 to 10 mass % of the total amount of the composition, preferably with a content of 0.01 to 5 mass % and particularly preferably with a content of 0.005 to 3 mass %.

One of the above extreme pressure agents may be singularly used or a combination of two or more thereof may be used.

Examples of the oiliness agent are saturated or unsaturated aliphatic monocarboxyl acid such as stearic acid or olein acid, dimerized aliphatic acid such as dimer acid or hydrogenated dimer acid, hydroxy aliphatic acid such as ricinoleic acid or 12-hydroxystearic acid, saturated or unsaturated aliphatic monoalcohol such as lauryl alcohol or oleyl alcohol, saturated or unsaturated aliphatic monoamine such as stearylamine or oleylamine, saturated or unsaturated carboxyl acid amide such as lauric acid amide or olein acid amide, partial ester of multivalent alcohol such as glycerin or sorbitol and saturated or unsaturated monocarboxyl acid, and the like.

One of the above oiliness agents may be singularly used or a combination of two or more thereof may be used. The oiliness agent is typically contained in the composition with a content of 0.01 to 10 mass % of the total amount of the composition, preferably with a content of 0.1 to 5 mass %.

Antioxidant is preferably a blend of phenol antioxidant such as 2,6-di-tert-butyl-4-methylphenol, 2,6-di-tert-butyl-4-ethylphenol, and 2,2'-methylenebis(4-methyl-6-tert-butylphenol), and amine antioxidant such as N,N'-diphenyl-p-phenylenediamine. In view of effects and cost, the antioxidant is typically contained in the composition with a content of 0.01 to 5 mass %, preferably with a content of 0.05 to 3 mass %.

An example of the metal deactivator is N—[N',N'-dialkyl (alkyl group having 3 to 12 carbon atoms) aminomethyl] tolytriazole or the like. Examples of the antifoaming agent are silicone oil, fluorinated silicone oil and the like.

The lubricating oil composition for refrigerator according to the present invention preferably has viscosity at 40 degrees C. of 1 to 400 $mm^2/s$, more preferably 3 to 300 $mm^2/s$, further more preferably 5 to 200 $mm^2/s$. Volume resistance of the composition is preferably $10^9 \Omega \cdot cm$ or more, more preferably $10^{10} \Omega \cdot cm$ or more, the upper limit of which is typically approximately $10^{11} \Omega \cdot cm$. Friction coefficient of the composition obtained through reciprocating friction test(s) is preferably 0.119 or less, more preferably 0.117 or less, further more preferably 0.112 or less, the lower limit of which is typically approximately 0.07.

In the method of lubricating a freezer that uses the lubricating oil composition for refrigerator according to the present invention, used amounts of the refrigerant listed above and the lubricating oil composition for refrigerator are preferably in a mass ratio (i.e., a mass ratio of the refrigerant/the lubricating oil composition for refrigerator) of 99/1 to 10/99, more preferably at a mass ratio of 95/5 to 30/70. When the used amount of the refrigerant is less than the above mass ratio, the freezing capability of the refrigerant is unfavorably deteriorated. On the other hand, when the used amount of the refrigerant is more than the above mass ratio, the lubricating capability of the refrigerator oil composition is unfavorably deteriorated.

Examples of a freezer (freezing system) to which the lubricating oil composition for refrigerator according to the present invention is preferably applied are: a freezing system that includes a compressor, a condenser, an expansion mechanism (capillary tube, expansion valve) and an evaporator as essential components; a freezing system including an ejector cycle; and a freezing system including a dryer (desiccant: natural or synthetic zeolite).

The above compressor may be open type, semi-hermetic type or hermetic type. A motor used in a hermetic-type compressor is an AC motor or a DC motor. The compressor may be any of a rotary compressor, a scroll compressor, a swing compressor and a piston compressor. The compressor may be a small compressor of approximately 0.2.2 kW or a large compressor of approximately 30 kW.

In the freezing system, a water content within the system is preferably 500 ppm by mass or less, more preferably 300 ppm by mass or less. For that purpose, the desiccant filled in the dryer is preferably provided by zeolite having pore diameter of 0.33 nm or less. The zeolite may be a natural zeolite or synthetic zeolite. It is further preferable that the zeolite exhibits 1.0% or less of $CO_2$ gas absorptive capacity at 25 degrees C. and at $CO_2$ gas partial pressure of 33 kPa. An example of the synthetic zeolite is XH-9, XH-600 (product name) manufactured by UNION SHOWA K.K. and the like. With the use of such desiccant, moisture can be efficiently removed without absorbing the refrigerant in the freezing cycle. In addition, since powderization on account of degradation of the desiccant itself can be restrained, clogging of piping and abnormal abrasion due to invasion of the powderized desiccant into slide portion of a compressor can be prevented, so that the freezers can be stably operated for a long time.

In addition, a residual air partial pressure is preferably 13 kPa or less, more preferably 10 kPa or less and further preferably 5 kPa or less.

The freezer to which the lubricating oil composition for refrigerator according to the present invention is applied includes a variety of slide portions (e.g., bearing) therein. In the present invention, slide portions made of engineering plastic or slide portions having organic coating layers or inorganic coating layers are used in view of sealability.

The engineering plastic is preferably, for instance, a polyamide resin, a polyphenylene sulfide resin, a polyacetal resin or the like in view of sealability, slidability, wear resistance and the like.

The organic coating layers each are preferably, for instance, a coating layer of a fluorine-containing resin (e.g., coating layer of polytetrafluoroethylene), a coating layer of polyimide, a coating layer of polyamide-imide or the like in view of sealability, slidability, wear resistance and the like.

On the other hand, the inorganic coating layers each are preferably, for instance, a graphite layer, a diamond-like carbon layer, a nickel layer, a molybdenum layer, a tin layer, a chrome layer, a nitride layer, a boron layer or the like in view of sealability, slidability, wear resistance and the like. The inorganic coating layers each may be formed by plating, CVD (chemical vapor deposition) or PVD (physical vapor deposition).

The slide portions each may be made of conventional alloy such as Fe-based alloy, Al-based alloy or Cu-based alloy.

Since the lubricating oil composition for refrigerator of the invention contains specific polyalkylene glycol derivative as acid scavenger in the predetermined base oil, minute amount of acid generated in the freezer system can be efficiently scavenged, thereby preventing the acid from reacting with the refrigerant. Accordingly, the lubricating oil composition for refrigerator of the invention can be stably used for a long time in a device using unsaturated chlorofluorocarbon refrigerant that is especially reactive with acid such as car air conditioner, electric driven car air conditioner, gas heat pump, air conditioning device, refrigerator, vending machine, showcase, various hot-water supply systems and cooling/heating system freezer.

A compressor (freezer compressor) of the invention uses the above-described lubricating oil composition for refrigerator. Specifically, the compressor uses a refrigerant containing: at least one of fluorine-containing organic compounds selected from the compounds represented by the above molecular formula (A) or a combination of the fluorine-containing organic compound and saturated fluorohydrocarbon compound; and the lubricating oil composition for refrigerator.

A part or an entirety of a slide portion of the compressor is preferably made of engineering plastic or is provided with an organic or inorganic coating layer. Examples of the slide portion of a swash-plate compressor are slide surface between a swash plate and a shoe, between a shoe and a piston or between a piston and a cylinder block.

Since at least a part of the slide portion is provided by the engineering plastic or is provided with the organic coating layer or inorganic coating layer, sealability of the freezer including the compressor and a freezer including the compressor can be improved as well as slidability and abrasion resistance.

Preferable examples of the engineering plastic, organic coating layer and inorganic coating layer are the same as described above.

EXAMPLES

Now, the present invention will be further described in detail by reference to Examples, which by no means limit the present invention.

Examples 1 to 7 and Comparatives 1 to 6

Lubricating oil compositions for refrigerator with the composition shown in Table 1 were prepared and stability of the compositions were evaluated in accordance with an autoclave test described below. The refrigerant was HFC1225ye(1,2,3,3,3-pentafluoropropene).

< Autoclave Test >

Composition of composition and refrigerant (at a ratio of 30 g/10 g, water content in the composition was 2000 ppm by mass), metal catalyst made of iron, copper and aluminum, and gasket were filled and sealed in an autoclave of inner volume of 200 mL (air partial pressure of 6.67 kPa (50 Torr)), which were kept at 175 degrees C. for 10 days. Subsequently, the appearance of the composition, appearance of the catalyst, presence of sludge and presence of peeled gasket were visually checked while measuring acid value. Incidentally, the acid value was measured by an electrical potential technique in accordance with "lubricating oil neutralization test" defined in JIS (Japanese Industrial Standard) K2501.

TABLE 1

|  |  |  | Example 1 | Example 2 | Example 3 | Example 4 | Example 5 | Example 6 | Example 7 | Comparative 1 |
|---|---|---|---|---|---|---|---|---|---|---|
| Content (mass %) | Base Oil | A1 | 97.5 | 93.5 | 93.5 | 93.5 | 93.5 | — | — | 93.5 |
|  |  | A2 | — | — | — | — | — | 93.5 | — | — |
|  |  | A3 | — | — | — | — | — | — | 93.5 | — |
|  | Acid Scavenger | B1 | 1 | 5 | — | — | — | — | — | — |
|  |  | B2 | — | — | 5 | — | — | 5 | 5 | — |
|  |  | B3 | — | — | — | 5 | — | — | — | — |
|  |  | B4 | — | — | — | — | 5 | — | — | — |
|  |  | B5 | — | — | — | — | — | — | — | 5 |
|  |  | B6 | — | — | — | — | — | — | — | — |
|  |  | B7 | — | — | — | — | — | — | — | — |
|  |  | B8 | — | — | — | — | — | — | — | — |
|  |  | B9 | — | — | — | — | — | — | — | — |
|  | Phosphorus-Base Additive | C1 | 1 | 1 | 1 | 1 | 1 | 1 | 1 | 1 |
|  | Antioxidant | D1 | 0.5 | 0.5 | 0.5 | 0.5 | 0.5 | 0.5 | 0.5 | 0.5 |
| Results of Autoclave Test | Appearance of Composition |  | Good | Good | Good | Good | Good | Good | Good | Good |
|  | Appearance of Catalyst |  | Good | Good | Good | Good | Good | Good | Good | Good |
|  | Presence of Sludge |  | No | No | No | No | No | No | No | No |
|  | Presence of Gasket Peeling |  | No | No | No | No | No | No | No | Yes |
|  | Acid Value (mgKOH/g) |  | 0.01> | 0.01> | 0.01> | 0.01> | 0.01> | 0.01> | 0.01> | 0.01> |

|  |  |  | Comparative 2 | Comparative 3 | Comparative 4 | Comparative 5 | Comparative 6 |
|---|---|---|---|---|---|---|---|
| Content (mass %) | Base Oil | A1 | 93.5 | 97.5 | 93.5 | 93.5 | 93.5 |
|  |  | A2 | — | — | — | — | — |
|  |  | A3 | — | — | — | — | — |
|  | Acid Scavenger | B1 | — | — | — | — | — |
|  |  | B2 | — | — | — | — | — |
|  |  | B3 | — | — | — | — | — |
|  |  | B4 | — | — | — | — | — |
|  |  | B5 | — | — | — | — | — |
|  |  | B6 | 5 | — | — | — | — |
|  |  | B7 | — | 1 | 5 | — | — |
|  |  | B8 | — | — | — | 5 | — |
|  |  | B9 | — | — | — | — | 5 |
|  | Phosphorus-Base Additive | C1 | 1 | 1 | 1 | 1 | 1 |
|  | Antioxidant | D1 | 0.5 | 0.5 | 0.5 | 0.5 | 0.5 |
| Results of Autoclave Test | Appearance of Composition |  | Good | Clouded | Clouded | Good | Clouded |
|  | Appearance of Catalyst |  | Good | Good | Good | Good | Good |
|  | Presence of Sludge |  | No | Yes | Yes | No | Yes |
|  | Presence of Gasket Peeling |  | Yes | No | Yes | Yes | No |
|  | Acid Value (mgKOH/g) |  | 0.01> | 0.01> | 0.01> | 0.01> | 0.01> |

< Remarks >

Base oil used was as follows.

A1: Polypropylene glycol dimethylether of which kinematic viscosity at 40 degrees C. was 46.7 mm$^2$/s A2: Copolymer of polyethylvinylether and polyisobutylvinylether (at copolymerization mol ratio of 9/1) of which kinematic viscosity at 40 degrees C. was 68.1 mm$^2$/s A3: Block copolymer of polypropyleneglycol and polyethylvinylether (at copolymerization mol ratio of 1/1) of which kinematic viscosity at 40 degrees C. was 75.2 mm$^2$/s Additives added to base oil were as follows.
(Acid Scavenger)

B1: Polypropyleneglycol diglycidyl ether (PO added mol number e=7, Mw=536)

B2: Polypropyleneglycol diglycidyl ether (PO added mol number e=11, Mw=768)

B3: Polypropyleneglycol diglycidyl ether (PO added mol number e=30, Mw=1870)

B4: Polypropyleneglycol monoglycidyl ether (PO added mol number e=11, Mw=724)

B5: 2-ethylhexyl glycidyl ether (Mw=186)

B6: α-olefin oxide (C16, Mw=240)

B7: 3,4-epoxycyclohexylmethyl(3,4-epoxy)cyclohexanecarboxylate (Mw=252)

B8: Polypropyleneglycol diglycidyl ether (PO added mol number e=3, Mw=214)

B9: Polypropyleneglycol diglycidyl ether (PO added mol number e=50, Mw=3100)
(Ester Phosphate Extreme Pressure Agent)

C1: TCP (Triclesyl phosphate)
(Antioxidant)

D1: DBPC (2,6-di-tert-butyl-4-methylphenol)

[Evaluation Result]

Examples 1-7 in Table 1 show results of autoclave test using a blend of a predetermined base oil and acid scavenger in the form of specific polyalkylene glycol derivative, where the appearance of both of the composition and catalyst was good and no sludge was generated. In addition, the gasket was not peeled. On the other hand, comparative 1 used 2-ethylhexyl glycidyl ether as acid scavenger and comparative 2 used α-olefin oxide as acid scavenger, both of which showed peeling in gasket. Comparative 3 used cyclohexanecarboxylate having a plurality of epoxy groups as acid scavenger, where the composition was clouded (i.e. get white) and sludge was generated. In comparative 4, though more ratio of acid scavenger was added in comparative 3, gasket was also peeled in addition to deterioration in acid scavenging performance. Though acid scavenger used in comparative 5 was similar to the acid scavenger of the invention in terms of structure thereof, since added mol number (e in the formula (1)) of oxypropylene (PO) group was as small as 3, sufficient acid scavenging performance was not obtained and gasket was peeled. Though acid scavenger used in comparative 6 was similar to the acid scavenger of the invention in terms of structure thereof, since added mol number (e in the formula (1)) of oxypropylene (PO) group was as large as 50, sufficient acid scavenging performance was not also obtained, the composition was clouded (i.e. got white) and sludge was generated.

The invention claimed is:

1. A composition, comprising
a lubricating oil composition comprising a base oil; and an acid scavenger added to the base oil, and
a refrigerant,
wherein
the acid scavenger is a polyalkylene glycol derivative having a PO added mol number of from 7 to 30 and selected from the group consisting of polypropylene glycol diglycidyl ether and polypropylene glycol monoglycidyl ether,
the acid scavenger is present in an amount of 1 to 10 mass % per a total amount of the lubricating oil composition,
the refrigerant consists of an unsaturated fluorohydrocarbon compound represented by formula (A)

$$C_pO_qF_rR_s \quad \text{(A)}$$

where R is hydrogen, p is an integer of 2 to 6, q is an integer of 0, r is an integer of 1 to 12 and s is an integer of 0 to 11, wherein at least one unsaturated carbon-carbon bonding is present in the molecule, and
the base oil is polypropylene glycol dimethyl ether.

2. The composition according to claim 1, wherein the kinematic viscosity of the base oil at 100 degrees C. is in a range of from 2 to 50 mm²/s.

3. The composition according to claim 1, wherein the compound represented by the molecular formula (A) is a compound represented by at least one of molecular formulae of $C_3HF_5$, $C_3H_2F_4$ and $C_3H_3F_3$.

4. The composition according to claim 1, wherein the lubricating-oil composition further comprises at least one additive selected from a group consisting of an extreme pressure agent, an oiliness agent, an antioxidant, a metal deactivator and an antifoaming agent.

5. A heating and/or cooling system comprising the composition according to claim 1.

6. The heating and/or cooling system according to claim 5, wherein a water content within the system is 500 ppm by mass or less while a residual air partial pressure is 13 kPa or less.

7. A refrigerator comprising the composition according to claim 1.

8. The refrigerator according to claim 7, wherein a slide portion of the refrigerator comprises engineering plastic, and/or comprises an organic coating layer or an inorganic coating layer.

9. The refrigerator according to claim 7, wherein the organic coating layer is a coating layer of polytetrafluoroethylene, a coating layer of polyimide, a coating layer of polyamide-imide or a thermosetting insulation layer formed with use of a resin paint containing: a resin base material made of polyhydroxyether resin and polysulfone-base resin; and a cross-linking agent.

10. The refrigerator according to claim 7, wherein the inorganic coating layer is a graphite layer, a diamond-like carbon layer, a tin layer, a chrome layer, a nickel layer or a molybdenum layer.

11. A compressor comprising the refrigerator according to claim 7.

12. The compressor according to claim 11, wherein a slide portion of the refrigerator comprises engineering plastic, and/or comprises an organic coating layer or an inorganic coating layer.

13. The compressor according to claim 11, wherein the engineering plastic is a polyamide resin, a polyphenylene sulfide resin or a polyacetal resin.

14. The compressor according to claim 11, wherein the organic coating layer is a coating layer of polytetrafluoroethylene, a coating layer of polyimide, a coating layer of polyamide-imide or a thermosetting insulation layer formed with use of a resin paint containing: a resin base material made of polyhydroxyether resin and polysulfone-base resin; and a cross-linking agent.

15. The compressor according to claim 11, wherein the inorganic coating layer is a graphite layer, a diamond-like carbon layer, a tin layer, a chrome layer, a nickel layer or a molybdenum layer.

16. The composition according to claim 1, wherein the acid scavenger has a mass average molecular weight (Mw) of 400 to 3000.

17. The composition according to claim 1, wherein the acid scavenger is present in an amount of from 1 to 5 mass % based on the total amount of the lubricating oil composition.

18. The composition according to claim 1, wherein the unsaturated fluorohydrocarbon compound has 2 to 3 carbon atoms.

19. The composition according to claim 18, wherein the unsaturated fluorohydrocarbon compound is selected from the group consisting of 1,2,3,3,3-pentafluoropropene and 2,3,3,3-tetrafluoropropene.

* * * * *